United States Patent [19]

Rubey

[11] Patent Number: 4,982,684
[45] Date of Patent: Jan. 8, 1991

[54] DIRECTIONAL SHOCK DETECTOR
[75] Inventor: Ulyss R. Rubey, Graham, Tex.
[73] Assignee: Detectors, Inc., Graham, Tex.
[21] Appl. No.: 520,717
[22] Filed: May 8, 1990

Related U.S. Application Data

[63] Continuation-in-part of Ser. No. 357,992, May 30, 1989, abandoned.

[51] Int. Cl.$^5$ .................. G01L 5/00; H01H 35/14
[52] U.S. Cl. .................. 116/203; 200/61.45 M
[58] Field of Search .................. 116/203, 204; 73/492, 73/652; 200/61.45 M; 340/436, 669; 346/7

[56] References Cited

U.S. PATENT DOCUMENTS

| | | | |
|---|---|---|---|
| 1,968,371 | 7/1934 | Butterworth | 116/203 |
| 2,898,415 | 8/1959 | Clurman | 200/61.45 |
| 2,909,055 | 10/1959 | Fish | 73/1 C |
| 3,097,272 | 7/1963 | Hautly | 200/61.49 |
| 3,218,870 | 11/1965 | Baker | 346/7 |
| 3,619,524 | 11/1971 | Gillund | 200/61.45 M |
| 3,707,722 | 12/1972 | Itoh | 346/7 |
| 3,835,809 | 9/1974 | Sinn, Jr. | 116/203 |
| 3,886,339 | 5/1975 | Jubenville | 200/61.45 M |
| 4,060,004 | 11/1977 | Scholz et al. | 73/514 |
| 4,177,751 | 12/1979 | Rubey | 116/201 |
| 4,388,890 | 6/1983 | Wester et al. | 116/204 |
| 4,404,839 | 9/1983 | Geisler | 73/1 B |
| 4,591,676 | 5/1986 | Jackman et al. | 200/61.45 M |

FOREIGN PATENT DOCUMENTS

| | | | |
|---|---|---|---|
| 2394091 | 9/1979 | France | 116/203 |
| 27678 | 3/1977 | Japan . | |

Primary Examiner—Allan N. Shoap
Assistant Examiner—W. Morris Worth
Attorney, Agent, or Firm—Geoffrey A. Mantooth; James C. Fails

[57] ABSTRACT

The detector has two disc shaped magnets that are magnetized through their respective thicknesses. One magnet is fixedly coupled to a container, and the other magnet is left free to slide transversely with respect to the fixed magnet. The magnets are oriented so that the opposite poles of the magnets are adjacent to each other. In the absence of a shock acting on the container, the free magnet remains in a centered position with respect to the fixed magnet. Indicating apparatus is provided to indicate when the free magnet is moved to an off-center position due to an accelerational force, and the direction of the accelerational force. In one embodiment, the indicating apparatus includes a marking device coupled to the free magnet and a recording surface coupled to the container. In another embodiment, the indicating apparatus includes a transparent cover and tabs for retaining the off-center free magnet.

66 Claims, 6 Drawing Sheets

DIRECTIONAL SHOCK DETECTOR

This is a continuation-in-part of pending application Ser. No. 07/357,992, filed May 30, 1989, now abandoned.

FIELD OF THE INVENTION

This invention relates to apparatus for detecting when equipment or articles of manufacture have been subjected to mechanical shock, or force. More particularly, it relates to a device that can be readily attached to a container or the like for monitoring when the container has been subjected to an acceleration, or force of acceleration magnitude, great enough to cause potential problems with equipment or elements within the case or container.

DESCRIPTION OF THE PRIOR ART

The prior art is replete with a wide variety of complex electronic, mechanical and electromechanical apparatus for detecting when shock has been received. Part of the most pertinent art is U.S. Pat. No. 4,125,085 and its divisional application Ser. No. 4,177,751, same inventor, same assignee. A plurality of patents were cited as references against these patents and this group of references is included herewith by incorporation.

In addition, the following references were turned up in a patent search, or pre-examination search made before filing of this application.

U.S. Pat. No. 4,591,676 discloses an inertia switch impact sensor in the form of a ferromagnetic ball mitered between dished first and second contacts.

U.S. Pat. No. 4,399,887 discloses collision sensing system for vehicles in which a seat occupant restraining device is provided.

U.S. Pat. No. 4,378,475 discloses a velocity sensitive impact switch with a permanent mounted magnet located at the bottom of a ball path or seat. With this arrangement, impact forces force the ball from the magnetic seat upwardly along a U-shaped path.

U.S. Pat. No. 4,361,106 discloses a shock indicating device in terms of a ball carrying a pin in an aperture such that when the ball is moved the pin is allowed to fall.

U.S. Pat. No. 4,329,549 discloses a magnetically biased velocity chain sensor in which a ball is provided at one end of a passageway with a movable spring at the other end such that movement of the mass causes the ball to depress the spring.

U.S. Pat. No. 4,060,004 discloses a sensor adapted to be triggered by deceleration forces, including a sensor in the form of a spring held ball in a central depression, but allowing the ball to move into other chambers by deflecting masses in response to acceleration or decelerational forces.

U.S. Pat. No. 3,909,568 discloses an impact monitor or shock indicator in which a calibrated device is provided having a pair of proposed spring loaded balls which serve as inertial masses retained in opposed seats.

U.S. Pat. No. 3,623,449 discloses an impact acceleration indicator with a recording instrument to produce a visual electrical signal when a predetermined accelerational level has been experienced.

U.S. Pat. No. 3,149,606 discloses accelerometers in the form of balls held intermediate biased spring ends holding the balls against seats.

U.S. Pat. No. 3,141,440 discloses an impact recording instrument having a circular structure in a housing with a series of uniformly spaced and uniformly dimensioned radially protruding surfaces and recording structure in the housing to respond to movement thereagainst.

U.S. Pat. No. 2,679,819 discloses a shock indicating device in the form of a ball or balls held intermediate bifurcated strips.

U.S. Pat. No. 2,601,440 discloses an impact indicator for containers in which a resiliently mounted weight will impact a rupturable visual means under the accelerational force.

U.S. Pat. No. 1,968,371 discloses a telltale device like a tilt mechanism on a coin operated machine.

U.S. Pat. No. 2,843,076 discloses a force measuring device in which a ball is retained by fingers and a magnetic field.

U.S. Pat. No. 3,619,524 discloses a sensor in which a ball is held in place by a magnetic field and fingers, but is displaceable by accelerational force.

Also, patents which employ a magnetic field of principle for various purposes are described in the following references:

U.S. Pat. No. 4,404,839, describes a safety ski binding incorporating a force testing device embodying a permanent magnet securable to the binding. The attractive force of the magnet holds a soft iron plate comprising a force engagement means on which the force producer of the binding can act.

U.S. Pat. No. 3,886,339, describes a sensing device for an automatic brake system that includes an inertia switch with a magnetic holding means. This device does not sense acceleration from all directions, does not give a visual indication of the direction and has no means for latching an indicator to afford an indication that the shock has been received and the direction of the shock.

U.S. Pat. No. 3,835,809, is a non-magnetic damage indicating device that has a safety tab to keep it in a loaded condition until attached to a container. The device has means urging an indicator to show that the container has been subject to stress in excess of a predetermined amount and the inertia activated means releases the indicator. This is strictly a mechanical device and does not indicate direction of shock.

U.S. Pat. No. 2,909,055, describes and claims an accurate torque meter standard for testing against torque wrenches and employing magnets along a moment arm. While this apparatus does show the employing two magnets to increase the force at a predetermined position along the arm, it does not show receipt of a shock, or a predetermined accelerational force or the direction from which the force is obtained.

Specifically, it is desirable that a Mechanical Shock detector have the following features not heretofore provided:

1. The device should provide an indication of receipt of a shock of predetermined magnitude and employ magnetic fields for maintaining a zero position of an indicator.

2. A magnetic field should be provided to maintain a second object adjacent a first object, and a case should provide interference from exterior magnetic fields or magnetic components.

3. The objects should preferably employ mutual magnetic fields, as from magnets to hold an indicator in a zero degree position, yet be disposed interiorly of the exterior container and omni directional so as to indicate a shock received from any direction.

4. The device should be retained in its neutral position by an arming pin means until it is ready to be employed and then should be releasable such that acceleration of a predetermined magnitude will effect an indication; yet the arming means should be easily releasable to allow the use of the detector when it is to be installed on a container or the like.

5. The device should have an ease of assembly in addition to having the foregoing features and should have elements of an electrical circuit so that it can be emplaced in an electrical circuit to provide an electrical and remote indication of direction of an acceleration force.

6. The device should indicate the direction of the acceleration that activated the device.

A consideration of the different approaches heretofore shows that these features have not been incorporated in the prior art devices.

SUMMARY OF THE INVENTION

It is an object of this invention to provide a shock detector that has one or more of the features delineated hereinbefore that have not heretofore been provided.

It is a specific object of this invention to provide a device that has all of the objects delineated hereinbefore and not heretofore provided.

These and other objects will become apparent from the descriptive matter hereinafter, particularly when taken into conjunction with the appended drawings.

In accordance with one embodiment of this invention there is provided a shock detector for detecting by way of a central zeroing magnet and a movable acceleration detecting indicator magnet when a force of predetermined acceleration has been received by a container to which is attached the detector characterized by a layer of adhesive for attaching the detector to a container or to an item that would otherwise be inside the container; and a measuring means for measuring if a predetermined acceleration has been received, the measuring means including a centrally disposed zeroing magnet and a second oppositely disposed magnet that is susceptible to receiving acceleration forces and movable on a low friction surface responsive competitively to the magnetic fields of the first magnet against the accelerational force with friction and damping movement to prevent resonant vibrational displacement; and including an arming pin for arming the detector. The arming pin is for holding the detector in an inactive state until ready to be employed.

The first and second magnets are mounted oppositely so as to attract each other and such that the first magnet will zero the second magnet if the magnitude of the acceleration that is received is less than the predetermined acceleration for which the detector is designed.

In accordance with one aspect of the invention, the shock detector includes housing means, first and second magnet means, indicating means and attachment means. The housing means houses the first and second magnet means. Each of the first and second magnet means produces a magnetic field. The first magnet means is fixedly coupled with the housing means and the second magnetic means is movable with respect to the first magnet means. Each of the first and second magnet means is disc shaped having a thickness and a diameter with the thickness being less than the diameter. Each has a polar axis through the thickness of the respective disc. The first and second magnet means are oriented so that the polar axes are parallel. The second magnet means is movable from a centered position in a direction which is transverse to the polar axis of the first magnet means when the housing means is subjected to an acceleration force. The second magnet means is maintained in the center position relative to the first magnet means by the magnetic fields produced by the first and second magnet means in the absence of an accelerational force. The indicating means indicates the displacement of the second magnet means due to an accelerational force and provides visual indication of the direction of an accelerational force. The attachment means is for attaching the housing means to an object which is to be monitored.

In another aspect of the invention, retaining means for retaining the second magnet means stationary with respect to the first magnet means is provided. The retaining means is removable to allow movement of the second magnet means with respect to the first magnet means. In still another aspect, a circumferential magnetic element is provided around the centered position. The circumferential element is magnetizable and is positioned so as to attract and retain the second magnet means when the housing means is subjected to an accelerational force of predetermined magnitude.

The shock detector of the present invention utilizes disc shaped magnets that are oriented so as to be magnetically attracted to each other. The magnets have a polar axis that extends through the thickness of the magnets so that the wide flat surfaces of the magnets will be attracted to each other. This configuration enables the magnets to be self-centering; in the absence of an accelerational force, the free magnet will be centered with respect to the fixed magnet. If a small accelerational force is received, the free magnet will be perturbed momentarily out of the centered position, only to recenter itself when the force is removed. If a larger accelerational force is received, the free magnet is perturbed a sufficient distance to prevent recentering, wherein the free magnet is latched into an off-center position. The threshold or minimum accelerational force required to dislodge the free magnet permanently from its centered position is determined by the size of the magnets and the spacing of the magnets. Latching is enhanced by using a magnetizable circumferential element such as a ring or a container or both that surround the centered position of the free magnet.

The occurrence and direction of an accelerational force is indicated by the indicating means. In one aspect, marking means is used. The marking means is coupled to the second magnet means, or free magnet, so as to move with the free magnet. The marking means contacts a recording surface on the housing means, wherein the magnitude and direction of an accelerational force is indicated by the marking means marking the recording surface when the free magnet is moved from the centered position. The marking means includes a pen and the recording surface includes paper.

In still another aspect, a window, in the form of a transparent cover, indicates the occurrence of an accelerational force by allowing an observer to view the position of the free magnet. A circumferential ring is provided to latch the free magnet out of the centered position. The ring preserves the directional information of the accelerational force by capturing the disc shaped free magnet. In still another aspect, tabs are provided to prevent movement of the free magnet along the circumferential ring.

In still other aspects, electrical switch means is used to indicate the occurrence of an accelerational force. One such switch means includes first and second electrical contacts, wherein the circumferential ring includes the first electrical contact and the second electrical contact is a metal container housing the magnets. The free magnet contacts the first and second contacts to close the switch means when the free magnet is located out of the centered position. Another type of switch means is actuated between open and closed states by the magnetic field of the free magnet. The switch means is coupled to the housing means such that the switch means is actuated by a change in the magnetic field of the free magnet, which change is caused by the movement of the free magnet from the centered position.

The detector can be electrically connected to clock means for providing the time of the occurrence of the accelerational force. The clock means has oscillator means for providing a reference signal for use in providing the time. The switch means is connected in parallel across the oscillator means, wherein when the switch means is closed by the movement of the free magnet from the centered position, the oscillator means is shorted thereby stopping the advance of time.

In still another aspect, a tamper-resistant container is provided for the detector. The container includes a base and a cover. The base receives the fixed and free magnets and also receives the cover so as to form a closed container. The base and the cover have locking means for lockingly coupled the base and the cover together.

BRIEF DESCRIPTION OF THE DRAWINGS

FIG. 1b is a cross-sectional view taken along the lines 1b—1b of FIG. 1a.

FIG. 6b is a cross sectional view taken along the lines of 6b—6b of FIG. 6a.

DESCRIPTION OF PREFERRED EMBODIMENTS

The directional shock detector of the present invention utilizes two magnets that are located so as to magnetically attach to each other. One of the magnets is movable with respect to the other magnet in response to an accelerational force. In the absence of any such accelerational force, the movable magnet is kept in a centered position relative to the other magnet by the magnetic fields produced by both magnets. Movement of the movable magnet out of the centered position is shown by indicating means. The indicating means also records the direction of the accelerational force.

Figure 1A:
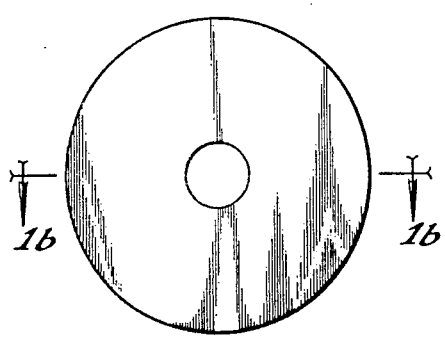
FIG. 1a is front view of a ring magnet such as may be employed in one embodiment of this invention.
Figure 1B:
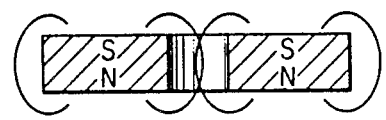

Referring to FIGS. 1a–3a, the magnets may comprise ring magnets. Preferably, the ring magnets are formed with a center hole less than one-fourth the diameter of the total ring, or magnetic disc. FIGS. 1a and 1b illustrate a type of ring magnet such as formed of a conventional magnetic material; for example, the magnetic material available from 3M. The magnets are discs having central openings therethrough. The magnets have a thickness and a circular diameter, with the thickness being less than the diameter. The magnets have smooth upper and lower surfaces to permit one magnet to slide against the other magnet. These ring magnets may be up to three inches in diameter. As illustrated in FIG. 1b, they will have the magnetic domains embedded in the host material oriented so as to form north and south poles perpendicularly through the ring of magnetic material. Thus, the polar axis of each magnet is through the thickness of the magnets. Consequently, the magnets 51, 52 are formed of magnetic material that is actually made into permanent magnets, wherein each magnet produces a magnetic field.

Figure 2A:
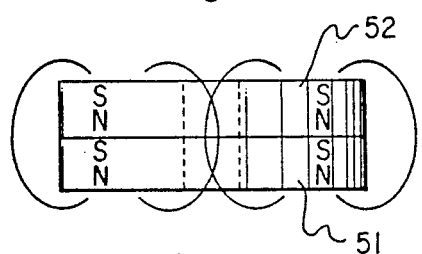
FIG. 2a is a cross-sectional view of an embodiment in which the two objects are two ring magnets that are maintained with their attracting faces in contact with a low friction interface, or zone of contact, between the two.
Figure 2B:
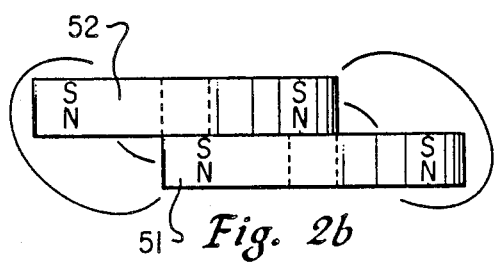
FIG. 2b illustrates how one magnet may be slid on the surface of the other by an accelerational force, or shock.

When the magnets 51, 52 are assembled together as shown in FIG. 2a, the opposite poles of the magnets are adjacent to each other so that the magnets are magnetically coupled together. The magnets will center themselves with respect to each other so that the magnets are coaxial. When one magnet 52 is perturbed out of its resting or coaxial position, as when it is subjected to an accelerational force or shock, it will slide relative to the other magnet 51, as shown in FIG. 2b. The moving magnet 52 slides in a direction that is perpendicular to the polar axes of the magnets. If the perturbation is not too great so as to break the magnetic coupling between the two magnets, the magnets will recenter when the accelerational force is removed, as shown in FIG. 2a. If the perturbation is large enough to break the magnetic coupling between the two magnets, the free magnet 52 will move of an off-center position. The center holes of the magnets receive an arming pin 17 (see FIG. 32). The arming pin prevents premature movement of the magnet 52. If no arming pin 17 is to be used, the magnets can be provided without center holes, wherein the magnets would be solid discs.

Figure 3A:
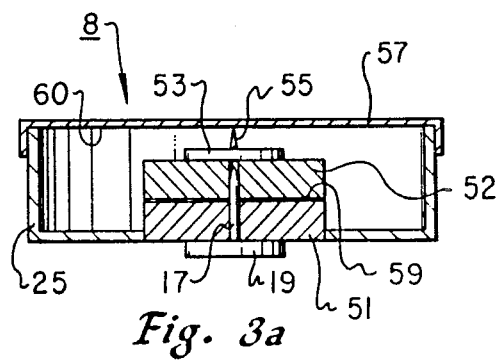
FIG. 3a illustrates an embodiment in which a marking device will mark on a recording surface the magnitude of movement of the second object with respect to the first object.

If one magnet 51 is held stationary relative to a case or container, as shown in the detector 8 of FIG. 3a, perturbations of the free magnet 52 from the centered position can be detected using various means. As can be seen more clearly in FIG. 3a, the fixed magnet 51 is coupled to a case 25. The magnet 51 is located inside of a cavity in the case 25. The cavity is covered with a removable lid 57. Thus, the fixed magnet 51, the case 25 and the lid 57 are all coupled together and move in unison when subjected to an accelerational shock. The free magnet 52 is magnetically coupled to the fixed magnet 51 so that the two magnets are centered. An arming pin 17 is inserted into the central openings of both magnets to prevent the free magnet 52 from moving relative to the fixed magnet. The arming pin 17, which is inserted from the bottom of the fixed magnet 51, has a head 19 thereon for facilitating removal of the arming pin.

The interface 59 between the magnets 51, 52 is a low friction interface, such as formed by Teflon, carbon particle layer, or plastic. The interface may be a wafer of Teflon, which is glued to one of the magnets. In the illustrated embodiment, the layer 59 has an aperture in the center thereof that will coincide with the aperture in the centers of the magnets. The aperture in the layer 59 is for receiving the arming pin 17.

Movement of the free magnet 52 is detected by providing a marking device 53 on the free magnet and a recording medium, such as paper 60, on the lid 57. The marking device 53 will have a sharp stylus 55 for making a mark on the paper 60 when it is caused to traverse by movement of the free magnet 52 with respect to the fixed magnet 51. Alternatively, the stylus 55 is provided with a felt tip that is impregnated with ink. The ink is of the long-lasting type so that it will not dry out on the stylus tip. The stylus 55 is centered on a wax spot on the paper 60, when the free magnet 52 is centered. The wax prevents the paper from drawing ink out of the stylus during quiescent periods. The paper 60 is provided with a tacky back so as to adhere to the inside surface of the lid 57.

Figure 3B:
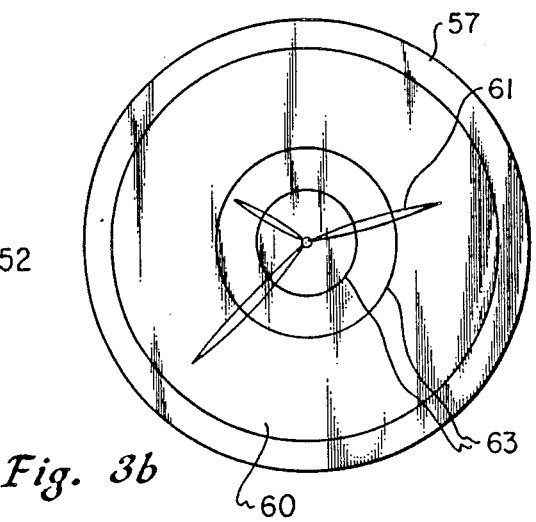
FIG. 3b is a frontal diagram of a recording surface such as the lid of the embodiment of FIG. 3a in which the marks have been made with concentric circles to facilitate cognition of the magnitude of the shock received with the azimuth of the peaks showing the direction the second object was forced by the low G-force, or gravitational shock, received.

Referring to FIG. 3b, there is illustrated the lid 57 and recording paper 60. To facilitate knowing the magnitude of the spikes 61 thereon, such as formed by the stylus 55 of the marking device 53 on the free magnet 52, concentric rings 63 are employed so as to mark the paper 60. The magnitude of the respective concentric rings may be chosen in accordance with the magnitude of the predetermined accelerational force, or mechanical shock, that is to be monitored for. For example, the rings may be in one to five G increments or even greater if higher accelerational forces are to be monitored for.

In the illustrated embodiment of FIG. 3b, the respective peak 61 will indicate the magnitude of the shock received by the concentric rings between which it is proportioned. Interpolation may be necessary to get an accurate idea of the magnitude of the accelerational force experienced. On the other hand, the azimuth of the respective ring will indicate the direction of movement of the second object 52 with respect to the first object 51. Accordingly, that direction indicates the direction from which came the mechanical shock, or accelerational G-force.

The embodiment of FIGS. 3a and 3b allows, by creating a permanent record on the paper 60, keeping track of the accelerational forces to which the item, or container in which an item may be placed, has been subjected, as measured by the detector. For example, if it is attached to a railroad (RR) car, the accelerational force magnitude can be determined as well as its direction.

The detector detects any force having a component in the two-dimensional plane of movement of the free magnet 52. To detect accelerational forces in three dimensions, two detectors, oriented at right angles to each other, may be used.

Figure 4A:
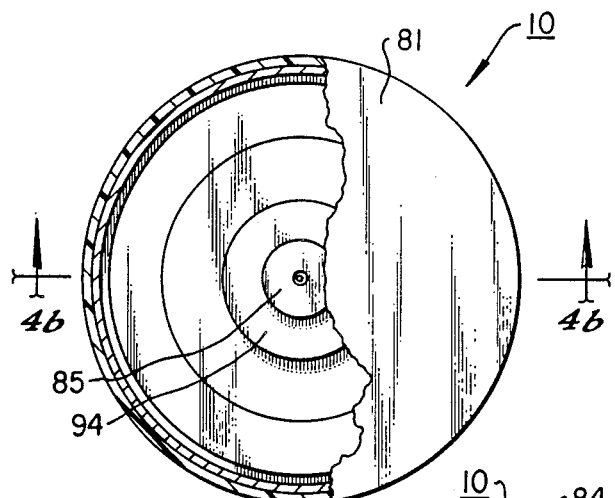
FIG. 4a is a top view of one embodiment of this invention showing the low friction surface visible through the transparent container top.
Figure 4B:
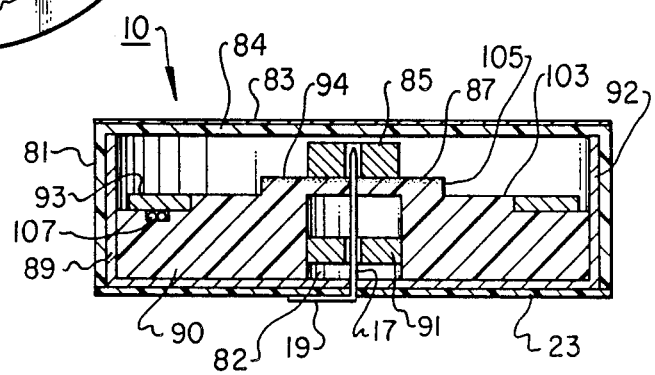
FIG. 4b is a cross-sectional view of the embodiment of FIG. 4a taken along the lines 4b—4b.
Figure 5:
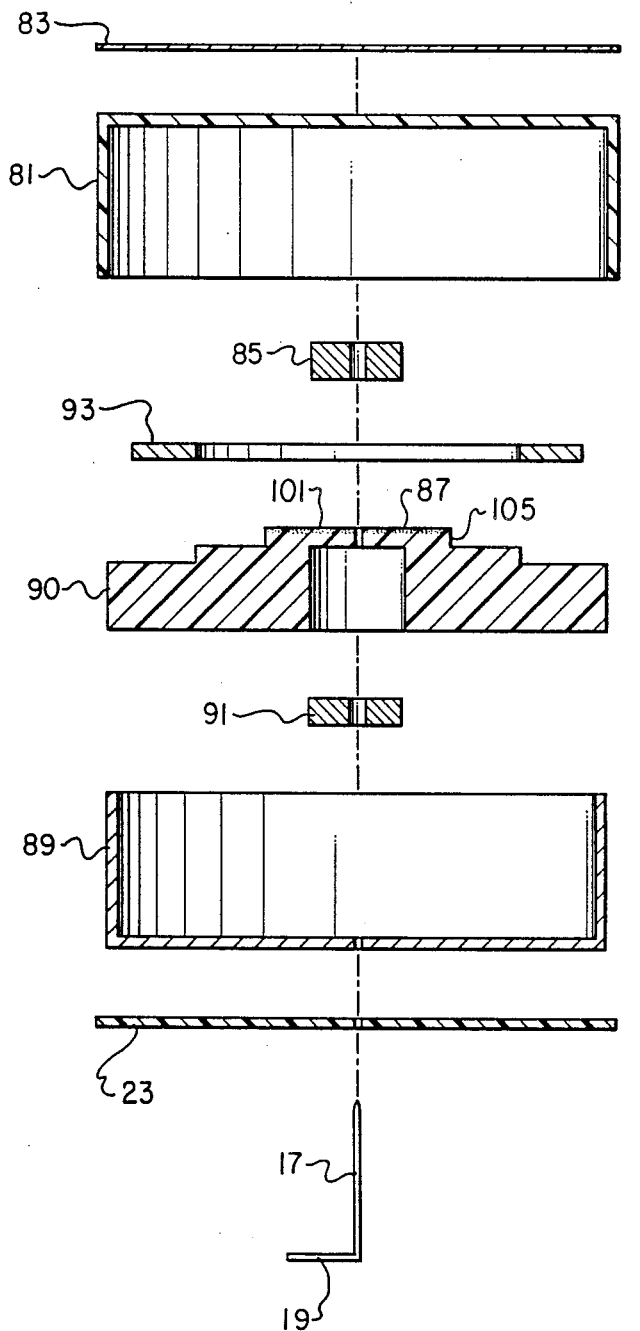
FIG. 5 is an exploded assembly view, partially schematic, illustrating the embodiment of FIG. 4b.

A particularly preferred and commercially useful embodiment is illustrated in FIGS. 4a, 4b, and 5.

Therein, the device 10 is characterized by an outer clear transparent cover 81. The transparent cover 81 forms a window so that an observer can easily see if the free magnet has been moved out of its centered position. If desired, a label 83 in the form of ferromagnetic metallized Mylar can be employed. This label can simply contain product information or it can contain a plurality of concentric rings such as illustrated in FIG. 3b to indicate the direction and magnitude of the shock or accelerational force. As can be seen more clearly in FIG. 4b, the device 10 includes a free magnet 85 that is mounted on a low friction surface 87. The device 10 also includes a metallic case 89. The metallic case 89 may be coated with tin or the like if it is to serve as an electrical conductor in an electrical circuit. This is referred to as enhancing the electrical conductivity of the case. In any event, the steel case 89 serves to protect the device against deleterious and adverse consequences of nearby magnetic or ferromagnetic material or other material that might interfere with the magnetic action. The device 10 also includes a plastic body 90 into which is pressed fit the fixed magnet 91. The body 90 incorporates the surface 87. A cylindrical bore 82 located beneath the surface 87 receives the fixed magnet 91. The device 10 also includes a steel ring 93 that may be pressed fit into the plastic body 90 to facilitate assembly. The body 90 is inserted into the case 89 such that the free magnet 85 is exposed at the open end of the case. The cover 81 is fitted onto the case 89 so as to cover the free magnet 85. The steel ring 93 may have its electrical conductivity enhanced, as by a coating of tin or the like, as was the case of the steel container 89, if it is to serve as part of an electrical circuit, also.

The two discs are washer-shaped or disc-shaped magnets, also referred to as toroidal magnets, and are used in conjunction with each other such that opposite, or attracting, poles attract each other. Thus, the magnets 85, 91 are attracted to each other and the free magnet 85 will center itself with respect to the fixed magnet 91, as shown in FIG. 4b. The magnets are prevented from contacting each other by a wall 101 which wall incorporates the low friction surface 87. The magnets are positioned at a predetermined distance from each other in accordance with the magnitude of the acceleration force to be detected. One magnet 91 is fixed inside the non-conductive, non-magnetic body 90. The other magnet 85 is free to move on the low friction surface 87 of the base 90. The magnets 85 and 91 may be formed of ceramic material and the fixed magnet may be pressed fit to the depth required by the G-force requirements, separated from the fixed magnet at a predetermined distance.

The concentric ring 93 of mild steel or the like, whether or not it is enhanced, is designed to facilitate assembly. Further automated assembly is accomplished by pressing the fixed magnet 91 into the hole 82 in the plastic body 90, pressing the plastic body 90 into the steel container 89; pressing the steel ring 93 into the plastic body, emplacing the free magnet 85 on the low friction surface 87 and snapping the cover 81 with the label 83 onto the container 89. The arming pin 17 is then inserted.

The arming pin 17 may be employed, as illustrated in FIG. 5, to prevent the movement of the free magnet 85. Backing tape 23, such as 1/36" thick double-sided tape, is employed at the bottom of the case 89 to affix the device 10 to a container which is to be monitored for shock and/or to allow uncovering of the arming pin head 19.

To install the detector 10 onto the object which is to be monitored, the arming pin 17 is removed, thereby freeing the free magnet 85, and the detector 85 is coupled to a flat surface on the monitored object with the tape 23. The tape 23 is provided with a backing or cover (not shown) to prevent inadvertent sticking. The backing is removed for installation of the device 10.

The container, and more specifically the case 89 and the metallized top layer 83, is made of magnetic material, like mild steel, or iron, and prevents nearby iron objects or magnetic fields from affecting the accuracy of the device 10. Expressed otherwise, the steel container serves as a shield to prevent interference by outside objects.

When the base is accelerated, as by receipt of the force, the free magnet 85 slides on the low friction surface 87 out of the centered position. If the accelerational force is not great enough, or is not of a long enough duration, the free magnet 85 will not move far enough to break free of the magnetic field and will be recentered back to its central original position by the fixed magnet 91. If the accelerational force is large enough, the force magnet 85 will break free of the magnetic field of the fixed magnet 91 and will move to an off-center position. As the free magnet moves out of the magnetic field of the fixed magnet, the inside wall 92 of the housing and the ring 93 attract it. These hold in place the free magnet to indicate the direction of acceleration and to assist in preventing the magnet from moving back to the center position. The container is also electrically conductive if it is to be employed in an electrical switch circuit and because of this electrical conductivity, it can be employed satisfactorily by suitable conductors and contacts.

The shock detector 10 of FIGS. 4a and b is a go-no go detector. Incidents of shock on the detector that are below a predetermined threshold are indicated by the free magnet 85 remaining in (or readjusting to) a centered position on a raised center portion 94. Below threshold shocks perturb container 89 and the fixed magnet 91, causing the free magnet 85 to slide on the surface 87 to leave the centered position 87. When the accelerational force is removed or reduced, the magnetic fields produced by the magnets will recenter the free magnet 85. Incidents of shock that are above the predetermined threshold are indicated by the free magnet 85 being off center and located on a peripheral surface. Such a large shock perturbs the container 89 and cause the free magnet 85 to slide on the surface 87 toward the container, wherein the magnetic attraction of the ring 93 and the side wall 92 of the container 89 causes the free magnet to move to an off-center position.

The raised center portion 94 is circular and is surfaced with the low friction surface 87. The raised center portion 94 is of a larger diameter than the free magnet 85, thereby permitting the free magnet to be perturbed off center for below threshold shock forces and yet still recenter. The raised center portion is surrounded by the peripheral surface 103. The peripheral surface is separated from the surface 87 by a stop surface 105 that is perpendicular to both surfaces 87, 103. The raised center portion 94 is closer to the top wall 84 of the cover 83 than is the peripheral surface 103. The peripheral surface 103 is coplanar with the top surface of the ring 93.

Once the free magnet 85 has moved off of the raised center portion 94 and onto the peripheral surface 103, the magnet is prevented from returning to the raised center portion and the centered position. The free magnet 85 is retained on the peripheral surface 103 by the magnetic case side wall 92 and the magnetic ring 93. Furthermore, the stop surface 105 prevents the free magnet 85 from returning to the raised center portion. The device 10 can be reused by manually resetting the free magnet 85 to the center position on the raised center portion 94. This is done by removing the cover 81 from the case 89 and picking up the magnet 85 from the peripheral surface 103 and placing it on the raised center portion 94. The cover 81 is then replaced on the case 89.

Although the detector 10 has been described with a ferromagnetic ring 93 and a ferromagnetic container 89 to draw and hold the force magnet 85 in an off-center portion, either the ring or the container can be used by itself, without the other, for this purpose.

The free magnet 85 can be provided with a bright color, such as orange or red, on its top surface to enhance visual perception of the location of the free magnet. To further accentuate the go-no go status, an opaque circular patch can be placed on the top wall 84 of the cover, so as to overlay the raised center portion 101. The patch would obscure the free magnet 85 from view unless the magnet were located off of the raised center portion. Thus, the absence of an orange spot from view would indicate the absence of any predetermined shocks, while the presence of an orange spot in view would indicate an occurrence of a shock exceeding the threshold. The direction of the shock is indicated by the location of the free magnet 85 on the circumference of the body 90.

As illustrated, the device is omni-directional in two-dimensions, as well as serving as a shock switch if employed with an electrical circuit. The free magnet 85, coated or electroplated with a conductive metal, serves as a shorting element between the ring 93 and the container 89. The ring 93 and the container 89 serve as contacts of an electrical switch. Wires 107 are carried in the body 90 and are respectively connected to the ring 93 and the container 89. When the free magnet 85 is moved off center, it contacts both the ring 93 and the container 89, thereby closing the electrical circuit and indicating the occurrence of a shock exceeding the threshold. The clear plastic cover 81 encloses the metal container to prevent any contact with the container, with personal or conductive objects.

From the foregoing it is believed clear how the preferred embodiments operate, particularly when taken in conjunction with the operational description of the device as a whole.

The magnitude of the threshold force required to activate the device is controlled in several ways. First, there is a non-magnetic spacer, shown in the form of the interface that separates the magnets 85, 91 to control the amount of shock force required. As indicated hereinbefore, the magnetic force attracting the objects is inversely proportional to the distance of separation. The interface is made up of a wall forming the plastic raised center portion 94 and an air gap formed by the bore 82 in the body 90. The location of the fixed magnet 91 in the bore 82 is controlled during the press fit operation of the magnet 91 into the bore. The closer the two magnets 85, 91 are located, the greater the magnetic attraction between them and thus the higher the threshold of force required to break the magnet 85 free and move off center. Likewise, the farther apart the two magnets are located, the lower the threshold. Through this principle, the magnetic force can be adjusted to any predetermined low gravitational or shock force necessary to effect dislodgement of the second magnet, or free magnet 85 in the preferred embodiment.

Secondly, the size, thickness, physical dimensions and material of the magnets will determine the magnitude and distribution of the magnetic force with which the magnets are attracted together and hence the shock force required to cause sliding action. Expressed otherwise, the force of the magnetic attraction is also operative in determining the predetermined gravitational force.

In addition, the surface 87, while low friction, does provide damping of high frequency shock forces. Such high frequency forces, which have a duration of about two milliseconds or less, are usually non damaging and thus need not be monitored. Such high frequency forces occur, for example, as a result of harmonics on traveling railroad cars. Thus, the friction of the surface 87 provides enough damping to prevent dislodgement of the free magnet 85 by resonant vibrations of lower than threshold magnitude.

Figure 6A:
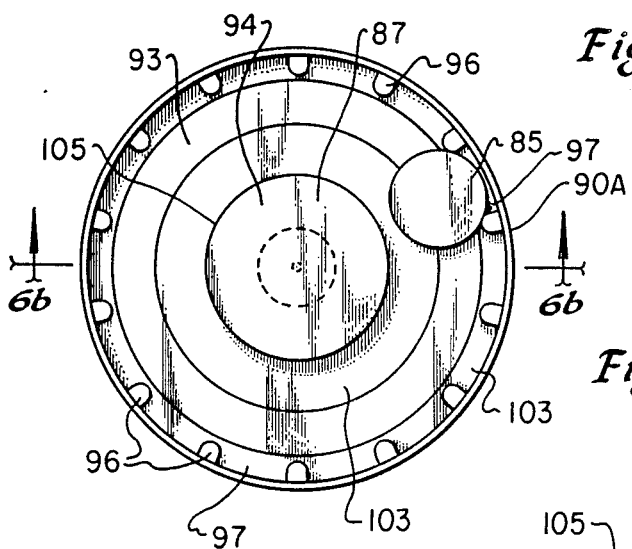
FIG. 6a is a top plan view of the plastic body in accordance with another embodiment of this invention.
Figure 6B:
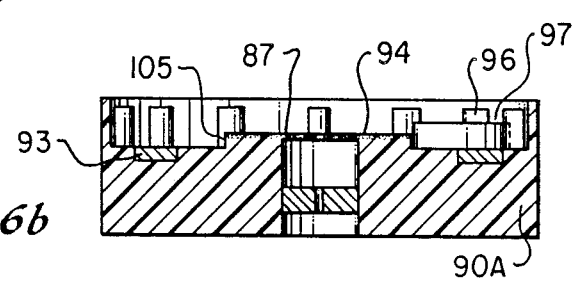

In FIGS. 6a and 6b there is shown a plastic body 90A, in accordance with another embodiment. The body 90A, which is inserted into the container 89, has tabs 96 for indicating the direction of the accelerational force by retaining the free magnet 85 in place, once the free magnet has been moved off center. The tabs 96 are located on the outer circumference of the peripheral surface 103 and protrude inwardly. Each tab 96 is separated from the adjacent tabs by a gap 97. The gap 97 receives the free magnet 85, when the free magnet is in the off-center position. When the free magnet 85 has moved to the off-center position, so that it is on the peripheral surface 103, it is prohibited from further movement by the tabs 96 and by the magnetic attraction of the ring 93 and the container 89.

The tabs 96 protrude a greater distance than the space between the free magnet and the raised low friction surface 87. In other words the space between the tabs 96 and the stop surface 105 is less than the diameter of the magnet 85. Therefore, high magnitude impacts cannot cam the magnet 85 over the tabs 96. Once the free magnet 85 has moved to an off-center position between two tabs 96, it remains in that position, preserving the directional information. If the magnet 85 strikes a tab 96 the attraction of the container wall 92 will pull it into the nearest space between the tabs, as illustrated in FIG. 6a.

Figure 7:
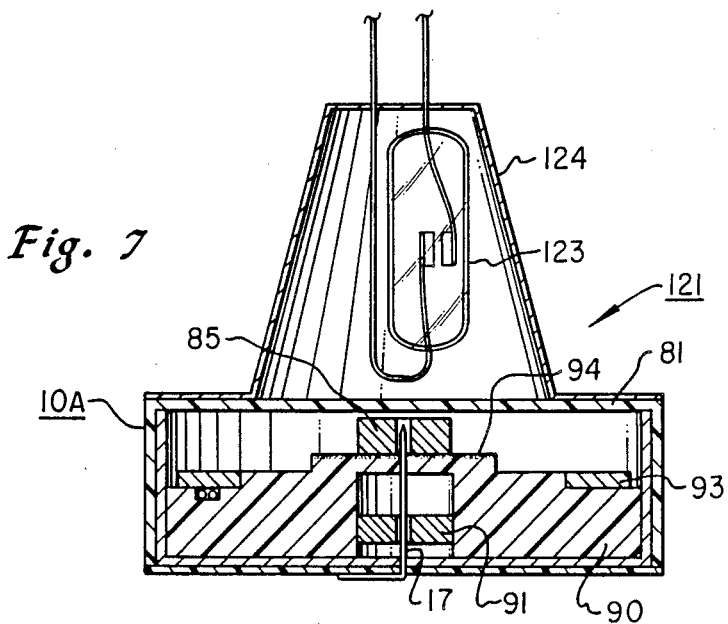
FIG. 7 is a cross-sectional side view of the shock detector apparatus, in accordance with another embodiment.

In FIG. 7, there is shown a detector unit 121 in accordance with another embodiment. The detector unit includes a detector 10A, which is substantially similar to the detector 10 described above, and a magnetically actuated switch 123. The detector 10A activates the switch 123 when the free magnet 85 moves from the center position to an off-center position, thereby providing an electrical indication of the go-no go status of the detector 10A. Unlike the detector 10 of FIGS. 4a and 4b wherein the free magnet is itself a component of the electrical switch and a conductor of electrical current, the switch 123 of the detector unit 121 is actuated by the magnetic field of the free magnet 85.

The switch 123, which may be a reed switch or a Hall effect switch, is located in proximity to the detector 10A so as to be actuated by the movement of the free magnet 85. In the preferred embodiment, the switch 123 is a reed switch that is coupled to the cover 81 of the detector 10A by a housing 124. The switch 123 is coupled to the housing 124 and the housing 124 is coupled to the cover 81. The switch 123, which includes a capsule with reeds inside, is oriented so that the capsule is perpendicular to the free magnet 85. The switch 123 is located in a generally central position with respect to the centered position of the free magnet 85. When the free magnet 85 moves from its centered position on the raised central portion 94, to an off-center position, the magnetic field as experienced by the switch 123 changes, thereby causing the switch to close from its normally open state.

Figure 9:
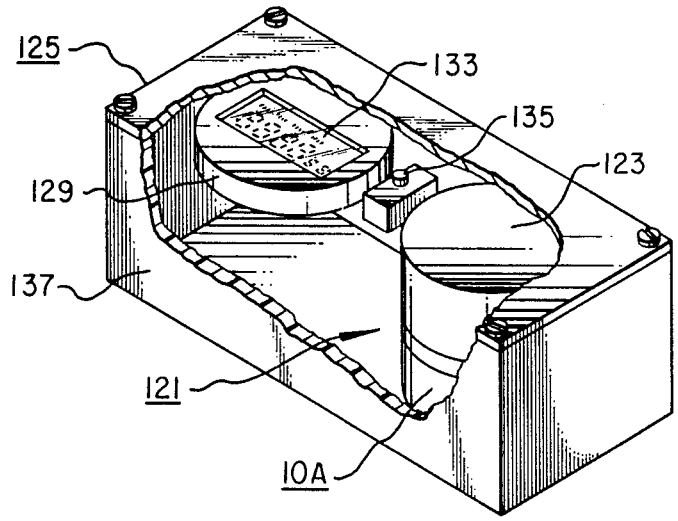
FIG. 9 is an isometric, partially cut-away view of a detector/clock unit utilizing the detector of FIG. 7 and the circuit of FIG. 8.

Frequently, it is desirable to monitor not only the occurrence of an above-threshold shock, but also the time of the occurrence. Knowing when a shock occurred allows the accessment for responsibility for any damage. The detector/clock unit 125 of FIG. 9 provides an indication of the time of the occurrence of an above-threshold shock. The detector/clock unit 125 includes the detector unit 121 and a clock 129.

Figure 8:
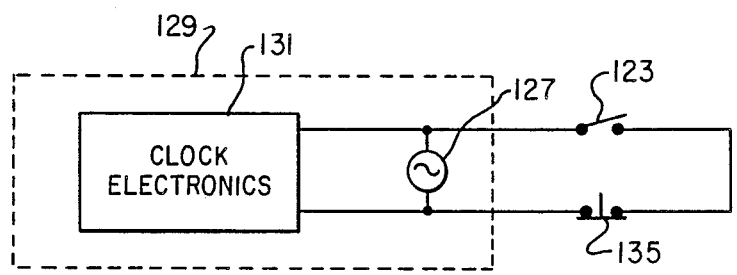
FIG. 8 is a schematic diagram of an electrical circuit utilizing the detector of FIG. 7.

Referring to FIGS. 8 and 9, the reed switch 123 is connected in parallel across an oscillator 127 of the conventional digital clock 129. The clock 129 has the oscillator 127, clock electronics 131 and a display 133. The oscillator 127 provides a reference signal and the clock electronics 131 counts the oscillations of the reference signal. A normally closed display switch 135 is provided in series with the reed switch 123. The reed switch 123 is located in proximity to a detector 10A.

I have discovered that when the oscillator 127 is shorted, by closing the switch 123, the time and date on the clock 129 will no long advance, but will be preserved. When the short is removed from across the oscillator 127, the clock will resume normal operation.

When the free magnet 85 of the detector 10A is in the center position, the reed switch 123 is open and the clock operates normally; the time and date advance in the clock 129 and are shown on the display 133. When the free magnet 85 moves to an off-center position, the change in the magnetic field causes the reed switch 123 to close, wherein the clock 129 stops advancing. In addition, the display 133 goes blank, providing a visual indication of a shock occurrence. To retrieve the time and date, the display switch 135 is momentarily opened, wherein the time and date reappear on the display 133. The displayed information is the time and date of the shock occurrence.

The detector/clock unit 125 is provided with a box-like housing 137 for the components. The clock 129, display switch 135, and detector unit 121 are all located within the housing 137, with the clock display 133 being visible and the display switch 135 being accessible. The housing is mounted to the object which is to be monitored for shock. The housing is mounted either by screws or adhesive tape.

Although the detector/clock unit 125 has been described as using the detector unit 121, the clock unit can also be used with the detector 10 of FIGS. 4a and 4b, wherein the free magnet makes or breaks the electrical circuit. The detector 10 is electrically connected in parallel across the oscillator 127, so that when the freed magnet 85 closes the electrical circuit by contacting the container 89 and the ring 93, the oscillator is shorted, and the time and date no longer advance.

The shock detector of the present invention may be used on containers to monitor the occurrence of damaging shock on the containers. Such damaging shock can occur, for example, when a container, like a shipping box or crate, is on a railroad car and the railroad car is sharply jolted during train operations. Because the detector is used to access liability, it is desirable to make the detector tamper-resistant. A tamper-resistant detector should inhibit the unauthorized recentering of the free magnet from an off-center position.

Figure 10:
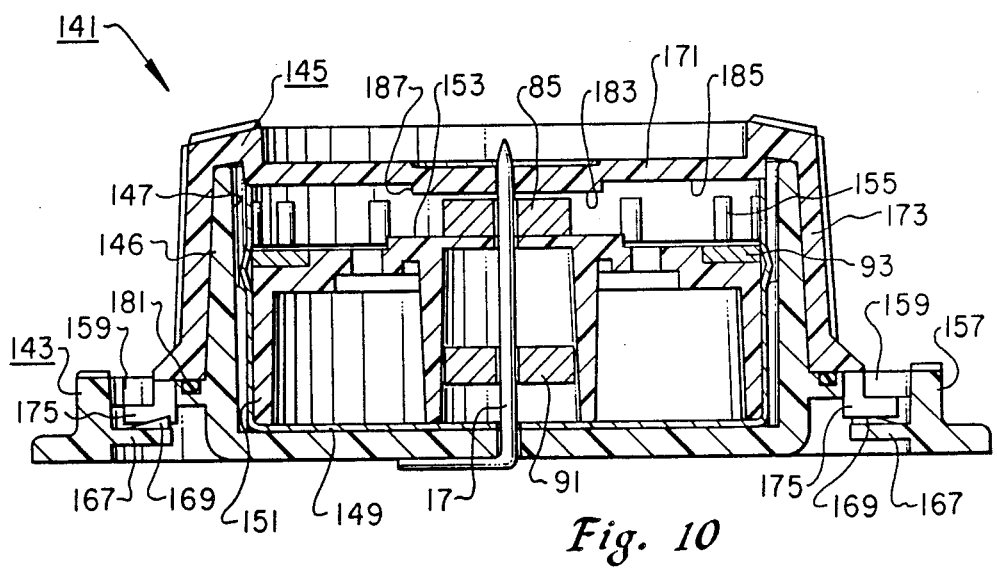
FIG. 10 is a cross-sectional view of the shock detector apparatus, in accordance with another embodiment.
Figure 11:
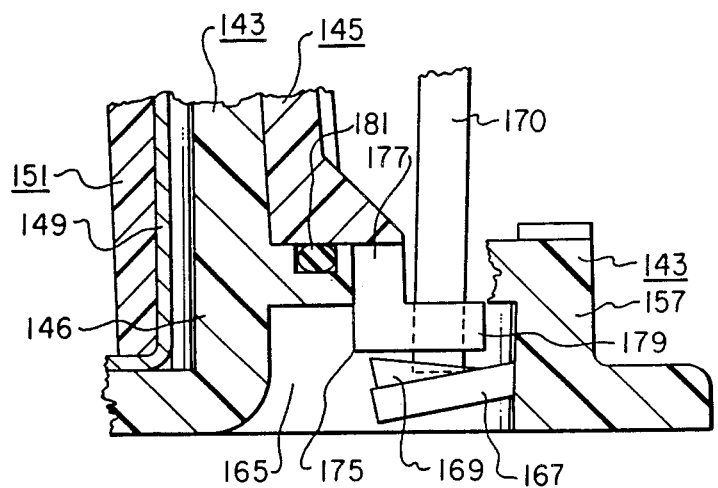
FIG. 11 is a transverse cross-sectional view of the locking arrangement between the base and the cover, for the apparatus of FIG. 10.

In FIGS. 10 and 11, there is illustrated a tamper-resistant detector 141. The detector 141 is similar to the detector 10 of FIGS. 4a and 4b, except that a base 143 is provided to lockingly engage the cover 145, thereby preventing access to the interior of the detector 141 and to the free magnet 85. The base 143 has a cylindrical portion 146 that has a cavity 147 therein. The cavity is open at one end and closed at the other end. The cavity 147 receives a metal container 149 while the container 149 receives a plastic body 151. The body 151 receives the fixed magnet 91 and supports the free magnet 85. The body 151 has a raised central portion 153 that supports the free magnet 85 when in the centered position relative to the fixed magnet 91. The body is also provided with a steel annular ring 93 around its outer circumference to maintain the free magnet in an off-center position when the free magnet is perturbed off of the raised center portion 153. Tabs 155 are provided around the circumference of the body, which tabs capture the free magnet 85 when in an off-center position.

Figure 12:
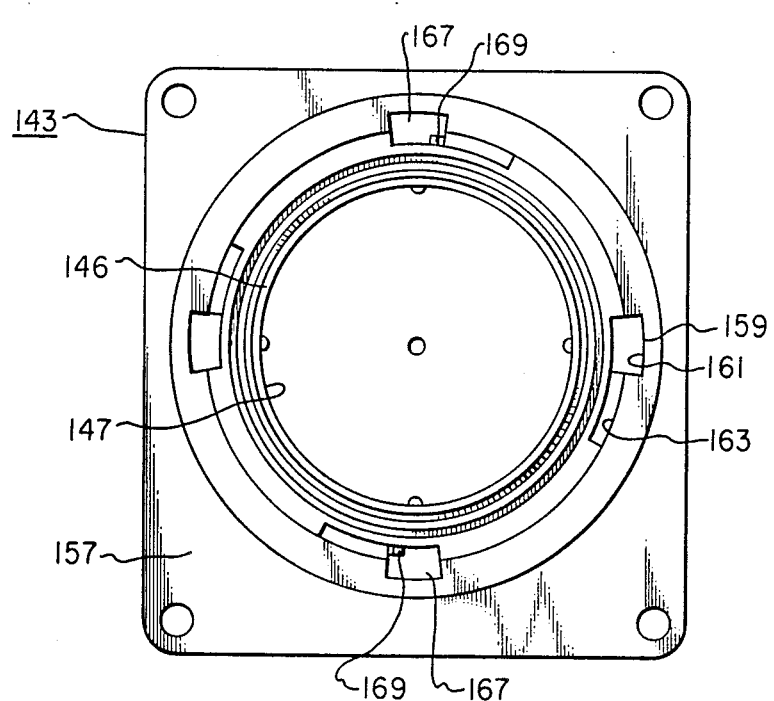
FIG. 12 is a plan view of the base of the detector of FIG. 10.

The base 143 also has a circumferential flange portion 157 extending radially outward from the closed end of the cylindrical portion 146. The flange portion 157 has arcuate slots 159 formed therethrough, for receiving the mounting projections 175 of the cover. In the preferred embodiment, there are four slots 159, spaced 90 degrees apart (see FIG. 12). Each slot 159 has a wide entry portion 161 and a narrower retaining portion 163. The retaining portions 163 are located in a clockwise direction from the respective entry portions 161, when viewed from the open end of the cylindrical portion 146. Located beneath each slot is a cavity 165 for receiving the foot portions 179 of the mounting projections 175. In the preferred embodiment, the cavity 165 is annular shaped, extending around the circumference of the cylindrical portion 146. Located in each cavity 165 is a wall 167, which is aligned with the respective entry portion 161. Each wall 167, which extends parallel to the respective slot 159, is spaced from the slot so that the foot portion 179 of the cover mounting projection 175 can be received in the cavity. Each wall 167 is generally rectangular and is coupled to the flange portion 157 along its outermost edge. Thus, the inside edge is left free, wherein the wall can flex up and down. Two of the walls 167, which are spaced 180 degrees apart, are provided with locking projections 169 to retain the respective mounting projections of the cover in the slot. The locking projections 169 are located on the side of the respective wall that faces the slot, and at the corner of the wall that is at the free end and adjacent to the retaining portion 163 of the slot. The locking projections 169 are tapered, with the widest portion being located near the retaining portion 163 of the slot and tapering down into the wall 167 as the projections extend away from the retaining portion.

The cover 145 has a top wall 171 and a cylindrical side wall 173 that fits over the cylindrical portion 146 of the base 143. The cover 145 has four mounting projections 175, each of which is received by a slot 159 on the base 143. Each mounting projection 175 has a thin connecting portion 177 and a broad foot portion 179. The connecting portions 172 extend longitudinally downward from the side wall 173. At the lower or free end of each connecting portion 177 is a foot portion 179 that extends radially outward from the connecting portion. Thus, each mounting projection 175 is an L-shaped member, when viewed transversely, as shown in FIG. 11. The foot portions 179 are sized to fit through the entry portion 161 of a slot 159, but not to fit through the retaining portion 163. The connecting portions 177 are sized to fit through both the entry portion 161 and the retaining portion 163 of a slot.

The cover 145 is secured to the base 143 by inserting the mounting projections 175 into the entry portions 161 of the slots 159, wherein each foot portion 179 is located between the slot 159 and the wall 167 in the cavity 165 and each connecting portion 177 extends through the slot. The cover 145 is then rotated clockwise relative to the base 143, wherein the foot portions 179 contact the tapered locking projections 169. This forces the wall 167 to flex downwardly as shown in FIG. 11, wherein the foot portion passes over the locking projection. (In FIG. 11 the wall 167 is shown forced downwardly by a key 170.) As the cover 145 is rotated clockwise, the foot portions 179 will clear the locking projections 169, and the flexed walls 167 will snap back in place to their unflexed positions, typically with an audible click. In the locked configuration, the connecting portion 177 extends through the retaining portion 163 of the slot, the foot portion 179 is located in the cavity 165 beneath the slot retaining portion, and the wall 167 is located in a counterclockwise direction from the foot portion. The locking projections 169 abut the respective foot portion 179, thereby preventing counterclockwise rotation of the cover. Further clockwise rotation is prohibited by the slot and the cover 145 cannot be lifted up from the base 143 because the foot portions 179 cannot pass through the slot retaining portions 163. The cover is thus secured. An O-ring 181 is provided between the cover 145 and the base 143 for a watertight enclosure. The O-ring 181 is received by a circumferential groove in the base flange portion 157.

To remove the cover from the base, and thus gain access to the interior of the detector, the respective walls 167 that have the locking projections 169 must be simultaneously depressed far enough for the locking projections to clear the foot portions 179. Then, the cover is rotated counterclockwise until the foot portions 179 of the mounting projections 175 are aligned with the entry portions 161 of the slots 159, wherein the cover 145 can be lifted off of the base 143. The walls 167 can be depressed by pins 170 that fit through the slots 159 to contact the walls. To provide for simultaneous flexing of the walls, the pins 170 can be joined together by way of a U-shaped member that can span the cover 145, wherein the pins 170 are located at the free ends of the U-shaped member.

The detector 141 is tamper-resistant because it is not obvious how to remove the cover from the base when the cover is in the locked configuration. Furthermore, the unlocking procedure is somewhat involved, requiring the simultaneous depression of plural walls 167, in order to allow rotation of the cover.

The detector 141 also prevents the recentering of the free magnet 85 from an off-center position by external magnetic fields. As shown in FIG. 10, the top wall 171 of the cover 145 has a circular central portion 183 that depends toward the body raised center portion 153, when the cover 145 is assembled onto the base 143. The central portion 183 is surrounded by a peripheral surface 185. The peripheral surface 185 is separated from the central portion by a stop surface 187 that is perpendicular to the peripheral surface.

The stop surface 187 prevents the recentering of the free magnet 85 by an external magnetic field. When the free magnet is in an off-center position, it is magnetically coupled to the ring 93. An external magnetic field can pick up the free magnet and bring it in to contact with the cover peripheral surface 185. By manipulating the external magnetic field, the free magnet can be moved to different locations on the peripheral surface. The stop surface 187 prevents the free magnet from being moved onto the central portion 183, where the free magnet could be recentered.

Although this invention has been described with a certain degree of particularity, it is understood that the present disclosure is made only by way of example and that numerous changes in the details of construction and the combination and arrangement of parts may be resorted to without departing from the spirit and the scope of the invention, reference being had for the latter purpose to the appended claims.

What is claimed is:

1. A detector for forwarding an indication if a predetermined acceleration has been received by a container, article, object and the like comprising:
    a. attachment means for attaching said detector to the container for monitoring if said predetermined acceleration has been received;
    b. indicating means for indicating that said predetermined acceleration has been received; said indicating means comprising first and second objects each of which produce a magnetic field, said first object being connected with said attachment means, said second object being movable with respect to said first object when said detector is subjected to said acceleration;
    c. retaining means for retaining said second object stationary with respect to said first object, said retaining means comprising a pin that is received by said first and second objects, said retaining means being removable to allow movement of said first object.

2. The detector of claim 1 wherein both said first object and said second object respectively comprise first and second ring magnets that are oriented so as to be parallel to each other, said second ring magnet being held adjacent to and centered with respect to said first ring magnet by said magnetic fields from said first and second ring magnets, said second ring magnet being movable with respect to said first ring magnet along a low friction surface.

3. The detector of claim 2 further comprising a magnetic shielding type body to prevent magnetic interference; a concentric ring of conductive material is employed to form a first contact of an electrical switch and does not contact said body which also serves as a second contact of said electric switch and wherein said second ring magnet is conductive so as to close said electric switch when moved by the accelerational force such that said second ring magnet contacts said first and second contacts; and wherein the strength of said first and second ring magnets and the separation therebetween is determined so as to effect a predetermined accelerational force threshold.

4. The detector of claim 2 wherein said second object has a marking device with a means for marking that contacts a recording surface such that movement of said second object with respect to said first object is recorded.

5. The detector of claim 4 wherein said marking means is centered by said magnetic fields in the absence of acceleration forces and wherein concentric circles are provided on said recording surface such that a magnitude of a received acceleration can be readily determined without requiring separate calibration tools.

6. The detector of claim 2 wherein said second object is located on a raised central portion when said second object is centered with respect to said first object, said raised central portion having a fixed diameter, wherein when said detector is subjected to said predetermined acceleration, said second object is moved off of said raised central portion and said raised central portion prevents said second object from returning to said raised central portion so as to afford a visual indication of the occurrence of said predetermined shock.

7. The detector of claim 6 further comprising:
    a. a container wall encircling said raised central portion such that said second object can be moved off of said raised central portion, said container wall having an inner circumference;
    b. plural tabs which are provided around the inner circumference of said container wall, said tabs projecting inwardly toward said raised central portion and being spaced apart so as to receive said second object when it is moved off of said raised central portion, wherein the specific tabs between which the second object is located provides an indication of the direction of said acceleration.

8. A shock detector, comprising:
    a. housing means for housing first and second magnet means, each of said first and second magnet means producing a magnetic field, said first magnet means being fixedly coupled with said housing means, said second magnet means being movable with respect to said first magnet means;
    b. each of said first and second magnet means being disc shaped having a thickness and a diameter with the thickness being less than the diameter, each of said first and second magnet means having a polar axis through the thickness of the respective disc, said first and second magnet means being oriented such that the polar axes are parallel;
    c. said second magnet means being movable from a centered position in a direction which is transverse to the polar axis of said first magnet means when said housing means is subjected to an acceleration force, wherein said second magnet means is maintained in said center position relative to said first magnet means by the magnetic fields produced by said first and second magnet means in the absence of any accelerational force;

d. indicating means for indicating the displacement of said second magnet means due to an accelerational force, said indicating means providing visual indication of the direction of an accelerational force;

e. attachment means for attaching said housing means to an object which is to be monitored.

9. The detector of claim 8 further comprising retaining means for retaining said second magnet means stationary with respect to said first magnet means, said retaining means being removable to allow movement of said second magnet means with respect to said first magnet means.

10. The detector of claim 9 wherein:

a. said first and second magnet means have respective apertures therein, said apertures being aligned with each other;

b. said retaining means comprises a pin that is received by said first and second magnet means apertures, said pin protruding out of said housing means.

11. A shock detector, comprising:

a. housing means for housing first and second magnet means, each of said first and second magnet means producing a magnetic field, said first magnet means being fixedly coupled with said housing means, said second magnet means being movable with respect to said first magnet means;

b. said first and second magnet means being oriented with respect to each other such that said second magnet means is maintained in a centered position relative to said first magnet means by the magnetic fields produced by said first and second magnet means in the absence of any accelerational force;

c. marking means coupled to said second magnet means so as to move with said second magnet means, said marking means contacting a recording surface on said housing means, wherein the magnitude and direction of an accelerational force is indicated by said marking means marking said recording surface when said second magnet means is moved from said centered position.

12. The detector of claim 11 wherein said marking means comprises a pen and said recording surface comprises paper.

13. The detector of claim 11 wherein each of said first and second magnet means are disc shaped and have a thickness and a diameter with the thickness being less than the diameter, each of said first and second magnet means having a polar axis through the thickness of the respective disc, said first and second magnet means being oriented so that the polar axes are parallel.

14. The detector of claim 13 wherein said first and second magnet means are located adjacent to each other with a low friction surface therebetween such that said second magnet means slides along said low friction surface in a direction which is transverse to the polar axes of said first magnet means.

15. The detector of claim 14 wherein said marking means comprises a pen and said recording surface comprises paper.

16. The detector of claim 13 further comprising a retaining pin, said retaining pin being received by respective apertures in said first and second magnet means wherein said second magnet means is held stationary with respect to said first magnet means, said retaining pin being removable from said first and second magnet means so as to allow movement of said second magnet means with respect to said first magnet means.

17. The detector of claim 16 further comprising attachments means for attaching said housing means to an object which is to be monitored.

18. The detector of claim 17 wherein said housing means has a flat back surface and said attachment means comprises an adhesive material on said back surface.

19. The detector of claim 18 wherein said marking means comprises a pen and said recording surface comprises paper.

20. A shock detector, comprising:

a. housing means for housing first and second magnet means, each of said first and second magnet means producing a magnetic field, said first magnet means being fixedly coupled with said housing means, said second magnet means being movable with respect to said first magnet means;

b. each of said first and second magnet means being disc shaped having a thickness and a diameter with the thickness being less than the diameter, each of said first and second magnet means having a polar axis through the thickness of the respective disc, said first and second magnet means being oriented such that the polar axes are parallel;

c. said housing means having a central portion and peripheral area around said central portion, said central portion being offset from said peripheral area such that said second magnet means is unable to move from said peripheral area to said central portion in the presence of said magnetic fields, said peripheral area having a circumferential element which is magnetizable, said circumferential element positioned so as to attract said second magnet means when said housing means is subjected to an accelerational force of predetermined magnitude;

d. said second magnet means being movable from a centered position on said central portion to said peripheral area in a direction which is transverse to the polar axis of said first magnet means when said housing means is subjected to an accelerational force, wherein said second magnet means is maintained in said centered position relative to said first magnet means by the magnetic fields produced by said first and second magnet means in the absence of any accelerational force;

e. indicating means for indicating the displacement of said second magnet means due to said predetermined accelerational force.

21. The detector of claim 20 further comprising:

a. plural tabs which are provided around the central portion in said peripheral area, said tabs being spaced apart so as to receive said second magnet means when it is located in said peripheral area, said tabs and said circumferential element retaining said second magnet means, wherein the specific tabs between which said second magnet means is located provide an indication of the direction of said activating accelerational force;

b. said housing means having window means for viewing the presence or absence of said second magnet means in said peripheral area.

22. The detector of claim 20 further comprising a retaining pin, said retaining pin being received by respective apertures in said first and second magnet means wherein said second magnet means is held stationary with respect to said first magnet means, said retaining pin being removable from said first and second magnet means so as to allow movement of said second magnet means with respect to said first magnet means.

19

23. The detector of claim 20 wherein said central portion has a low friction surface upon which said second magnet means is positioned when in the centered position.

24. The detector of claim 20 further comprising attachments means for attaching said housing means to an object which is to be monitored.

25. The detector of claim 24 wherein said housing means has a flat back surface and said attachment means comprises an adhesive material on said back surface.

26. The detector of claim 20, further comprising:
a. plural tabs which are provided around the central portion in said peripheral area, said tabs being spaced apart so as to receive said second magnet means when it is located in said peripheral area, said tabs and said circumferential element retaining said second magnet means, wherein the specific tabs between which said second magnet means is located provide an indication of the direction of said activating accelerational force;
b. said housing means having window means for viewing the presence or absence of said second magnet means in said peripheral area;
c. a retaining pin, said retaining pin being received by respective apertures in said first and second magnet means wherein said second magnet means is held stationary with respect to said first magnet means, said retaining pin being removable from said first and second magnet means so as to allow movement of said second magnet means with respect to said first magnet means;
d. said central portion has a low friction surface upon which said second magnet means is positioned when in the centered position;
e. attachment means for attaching said housing means to an object which is to be monitored.

27. The detector of claim 20 further comprising electrical switch means, said switch means including first and second electrical contacts, wherein said circumferential element comprises said first electrical contact, said second electrical contact being circumferentially located around said central portion, wherein said second magnet means contacts said first and second contacts to close said switch means when in said peripheral area.

28. The detector of claim 27 further comprising:
a. a retaining pin, said retaining pin being received by respective apertures in said first and second magnet means wherein said second magnet means is held stationary with respect to said first magnet means, said retaining pin being removable from said first and second magnet means so as to allow movement of said second magnet means with respect to said first magnet means;
b. said central portion has a low friction surface upon which said second magnet means is positioned when in the centered position;
c. attachment means for attaching said housing means to an object which is to be monitored.

29. The detector of claim 28 further comprising:
a. plural tabs which are provided around the central portion in said peripheral area, said tabs being spaced apart so as to receive said second magnet means when it is located in said peripheral area, said tabs and said circumferential element retaining said second magnet means, wherein the specific tabs between which said second magnet means is located provide an indication of the direction of said activating accelerational force;
b. said housing means having window means for viewing the presence or absence of said second magnet means in said peripheral area.

30. The detector of claim 27 further comprising:
a. plural tabs which are provided around the central portion in said peripheral area, said tabs being spaced apart so as to receive said second magnet means when it is located in said peripheral area, said tabs and said circumferential element retaining said second magnet means, wherein the specific tabs between which said second magnet means is located provide an indication of the direction of said activating accelerational force;
b. said housing means having window means for viewing the presence or absence of said second magnet means in said peripheral area.

31. A shock detector, comprising:
a. housing means for housing first and second magnet means, each of said first and second magnet means producing a magnetic field, said first magnet means being fixedly coupled with said housing means, said second magnet means being movable with respect to said first magnet means;
b. each of said first and second magnet means being disc shaped having a thickness and a diameter with the thickness being less than the diameter, each of said first and second magnet means having a polar axis through the thickness of the respective disc, said first and second magnet means being oriented such that the polar axes are parallel;
c. said second magnet means being movable from a centered position in a direction which is transverse to the polar axis of said first magnet means when said housing means is subjected to an acceleration force, wherein said second magnet means is maintained in said center position relative to said first magnet means by the magnetic fields produced by said first and second magnet means in the absence of any accelerational force;
d. a circumferential element coupled to said housing means and surrounding said centered position of said second magnet means, said circumferential element being magnetizable, said circumferential element being positioned so as to attract said second magnet means when said housing means is subjected to an accelerational force of predetermined magnitude, wherein said circumferential element retains the second magnet means when said second magnet means is displaced out of said centered position to indicate the direction of said accelerational force;
e. said housing means having a transparent cover wherein said second magnet means can be seen through said cover to determine the location of said second magnet means;
f. attachment means for attaching said housing means to an object which is to be monitored.

32. The detector of claim 31 wherein said first magnet means is received by a bore in said housing means so that said distance between said first and second magnet means is adjustable by adjusting the location of said first magnet means within said bore, wherein the predetermined magnitude of said accelerational force can be selected.

33. The detector of claim 32 wherein said housing means comprises a ferromagnetic container for containing said first and second magnet means, said container shielding said first and second magnet means from external magnetic fields.

34. The detector of claim 33 wherein said transparent cover has a metallized layer thereon for shielding said first and second magnet means from external magnetic fields.

35. The detector of claim 34 wherein said second magnet means is located on a low friction surface when said second magnet means is in said centered position, said low friction surface providing damping of movement of said second magnet means due to high frequency accelerational forces.

36. The detector of claim 31 wherein said housing means comprises a ferromagnetic container for containing said first and second magnet means, said container shielding said first and second magnet means from external magnetic fields.

37. The detector of claim 31 wherein said transparent cover has a metallized layer thereon for shielding said first and second magnet means from external magnetic fields.

38. The detector of claim 31 wherein said second magnet means is located on a low friction surface when said second magnet means is in said centered position, said low friction surface providing damping of movement of said second magnet means due to high frequency accelerational forces.

39. A shock detector, comprising:
a. housing means for housing first and second magnet means, each of said first and second magnet means producing a magnetic field, said first magnet means being fixedly coupled with said housing means, said second magnet means being movable with respect to said first magnet means;
b. each of said first and second magnet means being disc shaped having a thickness and a diameter with the thickness being less than the diameter, each of said first and second magnet means having a polar axis through the thickness of the respective disc, said first and second magnet means being oriented such that the polar axes are parallel;
c. said second magnet means being movable from a centered position in a direction which is transverse to the polar axis of said first magnet means when said housing means is subjected to an acceleration force, wherein said second magnet means is maintained in said center position relative to said first magnet means by the magnetic fields produced by said first and second magnet means in the absence of any accelerational force;
d. electrical switch means, said switch means being actuated between open and closed states by a changing magnetic field, said switch means being coupled to said housing means such that said switch means is actuated by the changing magnetic field produced by the movement of said second magnet means from said centered position.

40. The detector of claim 39 wherein said switch means is a reed switch.

41. The detector of claim 39 further comprising a circumferential element coupled to said housing means and surrounding said centered position of said second magnet means, said circumferential element being magnetizable, said circumferential element being positioned so as to attract said second magnet means when said housing means is subjected to an accelerational force of predetermined magnitude, wherein said circumferential element retains said second magnet means when said second magnet means is displaced out of said centered position to indicate the direction of said accelerational force.

42. The detector of claim 39 further comprising a retaining pin that is received by respective apertures in said first and second magnet means when said second magnet means is in said centered position, said retaining pin being for retaining said second magnet means stationary with respect to said first magnet means, said retaining pin being removable to allow movement of said second magnet means with respect to said first magnet means.

43. The detector of claim 39 wherein said second magnet means is located on a low friction surface when said second magnet means is in said centered position, said low friction surface providing damping of movement of said second magnet means due to high frequency accelerational forces.

44. The detector of claim 39 further comprising:
a. a circumferential element coupled to said housing means and surrounding said centered position of said second magnet means, said circumferential element being magnetizable, said circumferential element being positioned so as to attract said second magnet means when said housing means is subjected to an accelerational force of predetermined magnitude, wherein said circumferential element retains said second magnet means when said second magnet means is displaced out of said centered position to indicate the direction of said accelerational force;
b. a retaining pin that is received by respective apertures in said first and second magnet means when said second magnet means is in said centered position, said retaining pin being for retaining said second magnet means stationary with respect to said first magnet means, said retaining pin being removable to allow movement of said second magnet means with respect to said first magnet means;
c. said second magnet means being located on a low friction surface when said second magnet means is in said centered position, said low friction surface providing damping of movement of said second magnet means due to high frequency accelerational forces.

45. A shock detector, comprising:
a. housing means for housing first and second magnet means, each of said first and second magnet means producing a magnetic field, said first magnet means being fixedly coupled with said housing means, said second magnet means being movable with respect to said first magnet means;
b. each of said first and second magnet means being disc shaped having a thickness and a diameter with the thickness being less than the diameter, each of said first and second magnet means having a polar axis through the thickness of the respective disc, said first and second magnet means being oriented such that the polar axes are parallel;
c. said second magnet means being movable from a centered position in a direction which is transverse to the polar axis of said first magnet means when said housing means is subjected to an acceleration force, wherein said second magnet means is maintained in said center position relative to said first magnet means by the magnetic fields produced by said first and second magnet means in the absence of any accelerational force;

d. clock means for providing the time, said clock means being coupled to said housing means and having electrical oscillator means and display means, said oscillator means providing a reference signal for use in providing the time, said display means for displaying the time;

e. electrical switch means coupled to said housing means, said switch means being actuated from an open state to a closed state by the movement of said second magnet means from said centered position, said switch means being connected in parallel across said oscillator means, wherein when said switch means is closed by the movement of said second magnet means from said centered position, said oscillator is shorted thereby stopping the advance of said display means.

46. The detector of claim 45 wherein said switch means comprises a magnetic field actuated switch, said switch means being coupled to said housing means such that said switch means is actuated by the change in magnetic field produced by the movement of said second magnet means from said centered position.

47. The detector of claim 46 wherein said switch means is a reed switch.

48. The detector of claim 46 further comprising display switch means connected in series with said switch means, said display switch means being normally closed, wherein said display switch means can be opened to permit said clock means to display time on said display means.

49. The detector of claim 46 further comprising a circumferential element coupled to said housing means and surrounding said centered position of said second magnet means, said circumferential element being magnetizable, said circumferential element being positioned so as to attract said second magnet means when said housing means is subjected to an accelerational force of predetermined magnitude, wherein said circumferential element retains said second magnet means when said second magnet means is displaced out of said centered position to indicate the direction of said accelerational force.

50. The detector of claim 45 wherein said switch means includes first and second electrical contacts, said first and second contacts comprising respective first and second circumferential elements located around said centered position, with at least one of said circumferential elements being magnetizable so as to attract said second magnet means when said second magnet means is moved from said centered position by an accelerational force of predetermined magnitude, wherein said second magnet means contacts said first and second contacts when said second magnet means is off of said centered position, said second magnet means being electrically conductive.

51. The detector of claim 50 further comprising display switch means connected in series with said switch means, said display switch means being normally closed, wherein said display switch means can be opened to permit said clock means to display time on said display means.

52. A shock detector, comprising:

a. housing means for housing first and second magnetic means, at least one of said first and second magnetic means producing a magnetic field, said first magnetic means being fixedly coupled with said housing means, said second magnetic means being movable with respect to said first magnetic means;

b. said second magnetic means being located in a centered position relative to said first magnetic means in the absence of any accelerational force, said second magnetic means being movable from said centered position to an off-center position when said housing means is subjected to an accelerational force of predetermined magnitude;

c. a magnetizable circumferential element coupled to said housing means and surrounding said centered position of said second magnetic means, said circumferential element being positioned so as to attract said second magnetic means when said housing means is subjected to an accelerational force of predetermined magnitude, wherein said circumferential element retains said second magnetic means when said second magnetic means is displaced out of said centered position;

d. clock means for providing the time, said clock means being coupled to said housing means and having electrical oscillator means and display means, said oscillator means providing a reference signal for use in providing the time, said display means for displaying the time;

e. electrical switch means coupled to said housing means, said switch means being actuated from an open state to a closed state by the movement of said second magnet means from said centered position, said switch means being connected in parallel across said oscillator means, wherein when said switch means is closed by the movement of said second magnet means from said centered position, said oscillator is shorted thereby stopping the advance of said display means.

53. The detector of claim 52 wherein said switch means comprises a magnetic field actuated switch, said switch means being coupled to said housing means such that said switch means is actuated by the change in magnetic field produced by the movement of said second magnet means from said centered position.

54. The detector of claim 53 further comprising display switch means connected in series with said switch means, said display switch means being normally closed, wherein said display switch means can be opened to permit said clock means to display time on said display means.

55. The detector of claim 52 wherein said switch means includes first and second electrical contacts, said first and second contacts being circumferential around said centered position, with at least one of said first and second contacts comprising said magnetizable circumferential element, wherein said second magnet means contacts said first and second contacts when said second magnet means is off of said centered position, said second magnet means being electrically conductive.

56. The detector of claim 55 further comprising display switch means connected in series with said switch means, said display switch means being normally closed, wherein said display switch means can be opened to permit said clock means to display time on said display means.

57. A shock detector, comprising:

a. housing means for housing first and second magnet means, each of said first and second magnet means producing a magnetic field, said first magnet means being fixedly coupled with said housing means, said second magnet means being movable with respect to said first magnet means;

b. each of said first and second magnet means being disc shaped having a thickness and a diameter with the thickness being less than the diameter, each of said first and second magnet means having a polar axis through the thickness of the respective disc, said first and second magnet means being oriented such that the polar axes are parallel;

c. said second magnet means being movable from a centered position in a direction which is transverse to the polar axis of said first magnet means when said housing means is subjected to an acceleration force, wherein said second magnet means is maintained in said center position relative to said first magnet means by the magnetic fields produced by said first and second magnet means in the absence of any accelerational force;

d. indicating means for indicating the displacement of said second magnet means due to an accelerational force, said indicating means providing visual indication of the direction of an accelerational force;

e. said housing means comprising a base and a cover, said base for receiving said first and second magnet means, said base receiving said cover so as to form a closed container, said base and said cover having locking means for lockingly coupling said base and said cover together.

58. The detector of claim 57 wherein said locking means comprises plural mounting projections, plural slots and locking projections, said mounting projections being coupled to one of said base or said cover, said slots being located on the other of said base or said cover, each of said slots having an enlarged portion and a narrow portion, each of said mounting projections having a foot portion that is received by said respective enlarged portions of said slots when said cover is assembled onto said base, said cover being movable relative to said base to move said mounting projections from said enlarged portions of said slots to said narrow portions, said locking projections being coupled to said housing means so as to prohibit movement of said mounting projections to said slot enlarged portions from said narrow portions.

59. The detector of claim 58 wherein said locking projections are located on a flexible wall that is coupled to said base, wherein said wall can be flexed to move said locking projections out from engaging said mounting projections to allow the removal of said cover from said base.

60. The detector of claim 59 wherein:

a. said housing means has a central portion and peripheral area located within said assembled base and cover, said central area being located circumferentially around said central portion, said central portion being offset from said peripheral area such that said second magnet means is unable to move from said peripheral area to said central portion in the presence of said magnetic fields, said peripheral area having a circumferential element which is magnetizable, said circumferential element being positioned so as to attract said second magnet means when said housing means is subjected to an accelerational force of predetermined magnitude;

b. said cover having a cover central portion that is located adjacent to said second magnet means such that said second magnet means is interposed between said central portion and said cover central portion when said second magnet means is in the centered position, said cover having a circumferential peripheral area around said cover central portion, said cover having a stop surface separating said cover central portion and said cover peripheral area, wherein said stop surface prevents the movement of said second magnet means from said cover peripheral area to said cover central portion.

61. The detector of claim 59 further comprising a circumferential element coupled to said housing means and surrounding said centered position of said second magnet means, said circumferential element being magnetizable, said circumferential element being positioned so as to attract said second magnet means when said housing means is subjected to an accelerational force of predetermined magnitude, wherein said circumferential element retains said second magnet means when said second magnet means is displaced out of said centered position to indicate the direction of said accelerational force.

62. The detector of claim 61 further comprising:

a. plural tabs which are provided around the central portion in said peripheral area, said tabs being spaced apart so as to receive said second magnet means when it is located in said peripheral area, said tabs and said circumferential element retaining said second magnet means, wherein the specific tabs between said second magnet means is located provides an indication of said activating accelerational force;

b. said housing means having window means for viewing the presence or absence of said second magnet means in said peripheral area.

63. The detector of claim 59 further comprising a retaining pin, said retaining pin being received by respective apertures in said first and second magnet means wherein said second magnet means is held stationary with respect to said first magnet means, said retaining pin being removable from said first and second magnet means so as to allow movement of said second magnet means with respect to said first magnet means.

64. The detector of claim 57 further comprising a circumferential element coupled to said housing means and surrounding said centered position of said second magnet means, said circumferential element being magnetizable, said circumferential element being positioned so as to attract said second magnet means when said housing means is subjected to an accelerational force of predetermined magnitude, wherein said circumferential element retains said second magnet means when said second magnet means is displaced out of said centered position to indicate the direction of said accelerational force.

65. The detector of claim 64 further comprising:

a. plural tabs which are provided around the central portion in said peripheral area, said tabs being spaced apart so as to receive said second magnet means when it is located in said peripheral area, said tabs and said circumferential element retaining said second magnet means, wherein the specific tabs between said second magnet means is located provides an indication of said activating accelerational force;

b. said housing means having window means for viewing the presence or absence of said second magnet means in said peripheral area.

66. The detector of claim 57 further comprising a retaining pin, said retaining pin being received by respective apertures in said first and second magnet means wherein said second magnet means is held stationary with respect to said first magnet means, said retaining pin being removable from said first and second magnet means so as to allow movement of said second magnet means with respect to said first magnet means.

* * * * *